United States Patent Office 2,767,146
Patented Oct. 16, 1956

2,767,146

METHOD OF MAKING CLEANING COMPOSITIONS

Paul W. Bonewitz, Elmer H. Fults, and George S. Edwards, Burlington, Iowa, and Sebern W. Hockett, deceased, late of Mount Pleasant, Iowa, by Esther D. Hockett, administratrix, Mount Pleasant, Iowa, assignors to Bonewitz Chemicals, Inc., Burlington, Iowa, a corporation of Iowa No Drawing. Application February 1, 1956, Serial No. 562,626

6 Claims. (Cl. 252—156)

This application is a continuation-in-part of application Serial No. 125,652, filed November 4, 1949, and now abandoned.

This invention relates to the manufacture of compounds containing gluconic acid and sodium hydroxide and reaction products of the two.

We have found that highly effective compositions as particles in powder, flake, or granular form can be prepared by spraying the gluconic acid solution upon the powdered, flake or granular sodium hydroxide to form very effective cleaning compounds which are also highly useful in the treatment of water, for cleaning food containers and food processing equipment, and for metal cleaning, as well as other purposes.

This procedure has been found superior to merely preparing a powdered mixture of gluconic acid and its salts with sodium hydroxide.

In carrying out the invention, the dry sodium hydroxide is sprayed with an aqueous gluconic acid solution, usually a 50% concentration, and the surface of the caustic soda absorbs and adsorbs and slowly reacts with the gluconic acid to form the desired product. The dry individual granules or flakes include the reaction product with gluconic acid and unreacted alkali or gluconic acid or both.

The gluconic acid solution can be used in a concentration more or less than 50%. Thus, for example, a concentration as low as 25% and as high as 75% can be used. There can be used from one to 11 or 20 or even 25 pounds of the gluconic acid solution per 100 pounds of the sodium hydroxide, within the above range of 25% to 75% concentration of gluconic acid in solution, providing that sufficient gluconic acid solution is used to give at least about 0.5 pound of gluconic acid (dry basis) per 100 pounds of caustic soda. Generally, about one to 10 pounds of a 50% gluconic acid solution to each 100 pounds of caustic soda has been found satisfactory.

In normal practice, with higher concentration, less solution will be used and with lower concentration, more will be used. Sufficient of the gluconic acid solution to give ½ to 7½ pounds of gluconic acid (dry basis) per 100 pounds of sodium hydroxide has been found to be particularly desirable, although, the gluconic acid can be used in an amount up to 20 pounds per 100 pounds of sodium hydroxide in some instances where cost is not a controlling factor.

The problem of forming particles of this character is aggravated by the excessive heat created by the exothermic reaction of gluconic acid with sodium hydroxide. We have discovered that, by rapidly dissipating the heat of reaction, either by increasing the area of the reaction surfaces, as in a powder mixer, or by conducting the reaction on a thin layer or film of sodium hydroxide, and using an atomized spray, preferably one which will create a mist, to supply the aqueous solution of acid into contact with the alkali, that preferred products are obtained with the particles retaining their individual form. The spraying of the alkali flakes or granules can be conducted in several ways, as follows:

Example I

A batch of sodium hydroxide in granular or flake form is placed in a conventional powder mixer which has an internal rotating mixing means. The particles are thus agitated and may even be in a state of suspension. The gluconic acid solution is sprayed into the mixer, while the alkali is being rotated or agitated therein.

In a batch containing 400 pounds of caustic soda, 16 pounds of 50% aqueous gluconic acid solution, was sprayed into the mixer in about 15 minutes at a temperature of about 75° F. and humidity of about 60%. The sprayer was of the paint-gun type, with a fan-shaped spray outlet, and the agitated flakes or granules were subjected to a mist of the gluconic acid solution. In this operation, contacting large areas of caustic with minute quantities of acid distributes the heat of reaction, that is, the rate of reaction is reduced to a point where the chemical structure of the desired final product is not destroyed. Where the humidity is high, relatively slow introduction of the gluconic acid is necessitated, due to the fact that the gluconic acid and caustic soda instantly and vigorously react with generation of heat. Where the humidity is low, as in some sections of the West, the introduction of the gluconic acid solution may be at a much more rapid rate and may even be introduced in the form of coarse sprays.

When the reaction between gluconic acid and caustic soda occurs, moisture is liberated and in a dry atmosphere, this moisture is rapidly dissipated, whereas in a humid atmosphere, such as prevails in most of the United States, it does not pass off rapidly and accumulates to produce a saturated atmosphere, and this in connection with the hydroscopicity of the caustic soda, results in a gummy or caked mass. Hence, in humid atmospheres, it is necessary to introduce the gluconic acid solution at a relatively slow rate and in a measured amount to assure the formation of granules or flakes which retain their individuality.

Example II

Instead of using the conventional powder mixer, the caustic soda can be conveyed as a thin layer or film of particles on a moving belt, which may or may not be provided with shaking or agitating means, and during its travel sprayed with gluconic acid solution, using the same proportions as in Example I, preferably in a dry atmosphere. In this method, a large cooling area is provided to dissipate the heat of reaction, thereby slowing down the reaction and keeping the temperature at a point which will not disrupt the chemical structure of the final product.

Example III

Also, the spraying operation can be conducted at a point relatively close to the formation of the granules or flakes in a caustic soda plant, at which point the flakes or granules have a relatively high temperature (above about 200° F., but not greater than about 250° F., e. g., 225° F.), which will assist in evaporation and removal of moisture. Either the powder mixer or conveyor method may be used.

Example IV

Example I was repeated, using a 40% aqueous gluconic acid solution rather than a 50% solution. The product was substantially the same as that in Example I.

Example V

Example I was repeated, using a 60% aqueous gluconic acid solution rather than a 50% solution. The product was substantially the same as that in Example I.

*Example VI*

Example I was repeated, using 4 pounds of a 50% aqueous gluconic acid solution to 400 pounds of caustic soda.

*Example VII*

Example I was repeated, using 40 pounds of a 50% aqueous gluconic acid solution to 400 pounds of caustic soda.

*Example VIII*

Example I was repeated, using 60 pounds of a 50% aqueous gluconic acid solution to 400 pounds of caustic soda.

*Example IX*

Example I was repeated, using 8 pounds of a 50% aqueous gluconic acid solution to 400 pounds of caustic soda.

*Example X*

Example I was repeated, using 80 pounds of a 50% aqueous gluconic acid solution to 400 pounds of caustic soda.

The important factor in any of these operations is the spraying of the individual flakes or granules with the gluconic acid solution in an amount and at a rate which will permit the recovery of a granular mass of the alkali flakes or granules, which have been contacted and partially reacted with the gluconic acid.

At low temperature or high temperature with low humidity conditions, the rate of introduction is relatively fast, whereas when the humidity is high, the rate of introduction is necessarily relatively slow.

The granules or flakes can be treated in one cycle and after suitable cooling can be returned for similar treatment until the desired amount of gluconic acid is incorporated.

The particles are in the form of granules or flakes or powder of crystalline structure and are coated with the reaction product of the gluconic acid and the alkali. In addition to being coated with the reaction products, the coating will include some unreacted gluconic acid and the dried film also will include anhydrous forms of gluconic acid, namely, gamma and delta glucono lactones.

We claim:

1. The method of making reaction products of aqueous gluconic acid solution and sodium hydroxide in particle form, which comprises spraying 4% by weight of the gluconic acid solution, based on the weight of the sodium hydroxide, upon particles of the sodium hydroxide and rapidly dissipating the heat of reaction, the concentration of the aqueous gluconic acid solution being 50%.

2. The method of making reaction products of aqueous gluconic acid solution and sodium hydroxide in particle form, which comprises spraying 1 to 10% by weight of the gluconic acid solution, based on the weight of the sodium hydroxide, upon particles of the sodium hydroxide and rapidly dissipating the heat of reaction, the concentration of the aqueous gluconic acid solution being 50%.

3. The method of making reaction products of aqueous gluconic acid solution and sodium hydroxide in particle form which comprises spraying a 25% to 75% aqueous solution of gluconic acid upon particles of the sodium hydroxide, the gluconic acid used being in an amount of about 0.5 to 20%, dry basis, based on the weight of the sodium hydroxide.

4. The method of making reaction products of aqueous gluconic acid solution and sodium hydroxide in particle form which comprises spraying a 40% to 60% aqueous solution of gluconic acid upon particles of the sodium hydroxide, the gluconic acid solution being used in an amount to furnish about 0.5 to 7.5 pounds of gluconic acid, dry basis, per 100 pounds of sodium hydroxide.

5. The method according to claim 3, wherein the sodium hydroxide particles are in a state of agitation and the gluconic acid solution is sprayed as a mist and the heat of reaction is rapidly dissipated.

6. The method according to claim 3, wherein the sodium hydroxide particles are sprayed while presented in a thin layer.

References Cited in the file of this patent

UNITED STATES PATENTS

| 1,989,765 | Moss et al. | Feb. 5, 1935 |
| 2,046,192 | Snell et al. | June 30, 1936 |
| 2,584,017 | Dvorkovitz et al. | Jan. 29, 1952 |

OTHER REFERENCES

Condensed Chemical Dictionary, Reinhold Pub. Co., New York, 3d ed. (1942), pages 325 and 584.